US012427680B2

(12) United States Patent
Takashima

(10) Patent No.: US 12,427,680 B2
(45) Date of Patent: Sep. 30, 2025

(54) SAFETY CUTTER KNIFE

(71) Applicant: Olfa Corporation, Osaka (JP)

(72) Inventor: Yosuke Takashima, Suita (JP)

(73) Assignee: Olfa Corporation, Osaka (JP)

( * ) Notice: Subject to any disclaimer, the term of this patent is extended or adjusted under 35 U.S.C. 154(b) by 283 days.

(21) Appl. No.: 18/031,777

(22) PCT Filed: Jul. 12, 2021

(86) PCT No.: PCT/JP2021/026159
§ 371 (c)(1),
(2) Date: Apr. 13, 2023

(87) PCT Pub. No.: WO2022/079963
PCT Pub. Date: Apr. 21, 2022

(65) Prior Publication Data

US 2024/0017433 A1 Jan. 18, 2024

(30) Foreign Application Priority Data

Oct. 14, 2020 (JP) ................................ 2020-173435

(51) Int. Cl.
*B26B 5/00* (2006.01)
*B26B 29/02* (2006.01)

(52) U.S. Cl.
CPC .............. *B26B 5/005* (2013.01); *B26B 29/02* (2013.01)

(58) Field of Classification Search
None
See application file for complete search history.

(56) References Cited

U.S. PATENT DOCUMENTS 10,315,325 B2 * 6/2019 Votolato .................. B26B 29/02
2018/0099424 A1 4/2018 Huang
2018/0333870 A1 * 11/2018 Rus ......................... B26B 5/006
2019/0202074 A1 7/2019 Chernyshou et al.
2020/0215708 A1 * 7/2020 Nguyen .................... B26B 3/08
2021/0187763 A1 6/2021 Takashima
2024/0017433 A1 * 1/2024 Takashima .............. B26B 5/005
2024/0190028 A1 * 6/2024 Trivedi ................... B26B 5/005

FOREIGN PATENT DOCUMENTS

JP 3054221 U 11/1998
JP 2004-36810 A 2/2004
JP 3204038 U 5/2016

(Continued)

OTHER PUBLICATIONS

Japanese-language Office Action issued in Japanese Application No. 2020-173435 dated Jan. 12, 2021 with English translation (10 pages).

(Continued)

*Primary Examiner* — Hwei-Siu C Payer
(74) *Attorney, Agent, or Firm* — Crowell & Moring LLP

(57) ABSTRACT

A safety cutter knife of the present disclosure includes a blade part that includes a blade, a guard attached to one end of the blade, and a head on which the blade is fixed and that has a cutting edge of the blade being exposed between the guard and the head, and a grip part that detachably holds the head in the state where the cutting edge of the blade and the guard in the blade part protrude.

10 Claims, 5 Drawing Sheets

(56) References Cited

FOREIGN PATENT DOCUMENTS

JP 2019-208569 A 12/2019

OTHER PUBLICATIONS

International Preliminary Report on Patentability (PCT/IB/338 & PCT/IB/373) issued in PCT Application No. PCT/JP2021/026159 dated Apr. 27, 2023, Including English translation of (Japanese-language Written Opinion (PCT/ISA/237), filed on Apr. 13, 2023) (5 pages).
English translation of (JP 3054221 U, filed on Apr. 13, 2023) (16 pages).
English translation of (JP 3204038 U, filed on Apr. 13, 2023) (19 pages).
Extended European Search Report issued in European Application No. 21879706.6 dated Oct. 4, 2024 (9 pages).
International Search Report (PCT/ISA/210) issued in PCT Application No. PCT/JP2021/026159 dated Sep. 7, 2021 with English translation (four (4) pages).
Japanese-language Written Opinion (PCT/ISA/237) issued in PCT Application No. PCT/JP2021/026159 dated Sep. 7, 2021 (three (3) pages).

* cited by examiner

SAFETY CUTTER KNIFE

TECHNICAL FIELD

The present disclosure relates to a safety cutter knife capable of safely cutting a piece of cardboard, a cord material, and the like.

BACKGROUND ART

A safety cutter knife is used to safely cut a paper sheet, a piece of cardboard, a piece of corrugated cardboard, and the like in unpacking work. A user thereof grips a grip part of the safety cutter knife and pulls the grip part toward the user to cut a piece of cardboard or the like using a blade protruding from the grip part.

As the safety cutter knife, for example, Patent Document 1 discloses a safety cutter knife that includes a grip part, a blade protruding from the grip part, and a head part disposed on the tip of the protruding blade. The blade of the safety cutter knife disclosed in Patent Document 1 is coupled with the grip part and the head part, and is integrally configured therewith.

PATENT DOCUMENTS

Patent Document 1: JP2019208569A

SUMMARY OF THE INVENTION

Problems to be Solved by the Invention

The blade of the safety cutter knife, however, becomes worn by repetitive use thereof resulting in an increase of the cutting resistance thereof. The cutting becomes difficult and the fatigue of the user's hand is increased. In Patent Document 1, because the blade and the grip part are integrally formed, when the blade becomes worn, it becomes necessary to discard the safety cutter knife and replace it with a new safety cutter knife.

An object of the present disclosure is to provide a safety cutter knife whose blade can easily be replaced and that is continuously usable for a longer period of time.

Solutions to the Problems

A safety cutter knife of one aspect of the present disclosure includes a blade part that includes a blade, a guard attached to one end of the blade, and a head on which the blade is fixed and that has a cutting edge of the blade being exposed between the guard and the head, and a grip part that detachably holds the head in the state where the cutting edge of the blade and the guard in the blade part protrude.

Effects of the Invention

According to the present disclosure, a safety cutter knife can be provided, whose blade can easily be replaced and that is continuously usable for a longer period of time.

DETAILED DESCRIPTION

Figure 1:
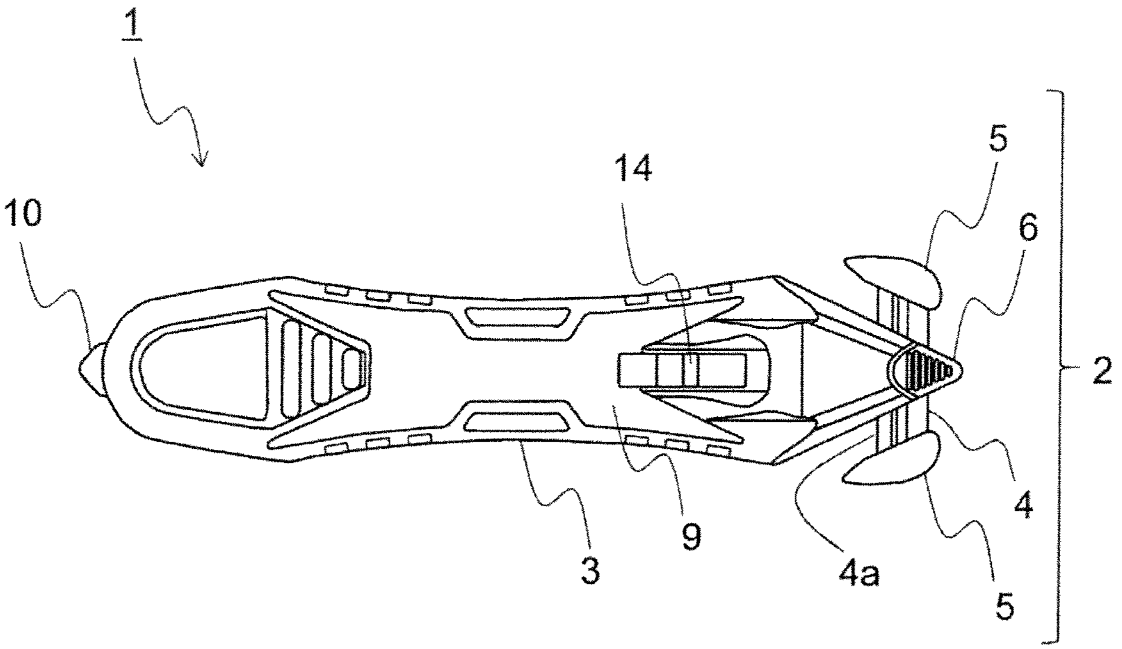
FIG. 1 is a top diagram of one example of a safety cutter knife of a first embodiment according to the present disclosure.

A safety cutter knife of a first aspect of the present disclosure includes a blade part that includes a blade, a guard attached to one end of the blade, and a head on which the blade is fixed and that has a cutting edge of the blade being exposed between the guard and the head, and a grip part that detachably holds the head in the state where the cutting edge of the blade and the guard in the blade part protrude.

Due to the above configuration, the increased cutting resistance can be reduced and the safety cutter knife can continuously be used for a longer period of time by replacing the blade part that includes the blade.

In a safety cutter knife of a second aspect of the present disclosure, a first rugged structure may be disposed on the head of the blade part, second rugged structure capable of being fitted with the first rugged structure may be disposed on the grip part, and the safety cutter knife may include a holding mechanism that maintains the fitting state of the first rugged structure and the second rugged structure in a releasable manner.

Due to the above configuration, the holding mechanism maintains the fitting state of the first rugged structure and the second rugged structure and the blade part is attached to the grip part. The fitting state of the first rugged structure and the second rugged structure can be released by the holding mechanism, so that the blade part is be released from the grip part.

In a safety cutter knife of a third aspect of the present disclosure, the holding mechanism may include a lever that is movable between a holding position that maintains the fitting state of the first rugged structure and the second rugged structure and a release position that releases the fitting state, and a portion of the lever may be disposed being operably exposed from the grip part.

Due to the above configuration, the fitting state of the first rugged structure and the second rugged structure can be maintained or released by operating the exposed portion of the lever, selecting the holding position or the release position and moving the lever.

In a safety cutter knife of a fourth aspect of the present disclosure, the holding mechanism may include a spring that biases the lever from the release position toward the holding position.

Due to the above configuration, in the state where a user does not touch the lever, the lever is kept at the holding position and the attachment state of the blade part and the grip part is maintained. On the other hand, when the user operates the lever with intent and the lever is thereby moved from the holding position to the release position, the blade part can be detached from the grip part.

In a safety cutter knife of a fifth aspect of the present disclosure, a portion of the lever may be operably exposed on both sides of the grip part.

Due to the above configuration, the user can easily detach the blade part from the grip part by operating one lever regardless of the dominant hand of the user and regardless of the front and the back faces of the grip part.

In a safety cutter knife of a sixth aspect of the present disclosure, an inserting protrusion part including the first rugged structure may be disposed on an end of the head, a hole part into which the inserting protrusion part of the head is inserted and that includes the second rugged structure may be disposed on an end of the grip part, a third rugged structure may be disposed on the end of the head on both sides of the inserting protrusion part, and a fourth rugged structure to be fitted with the third rugged structure may be disposed on the end of the grip part on both sides of the hole part.

Due to the above configuration, when the safety cutter knife is used, any jouncing of the blade part against the grip part can be suppressed.

In a safety cutter knife of a seventh aspect of the present disclosure, the grip part may include a slip resistor that covers a portion of the grip part and that increases the friction resistance of the surface.

Due to the above configuration, any slipping of the hand of the user gripping the safety cutter knife is suppressed.

First Embodiment

A safety cutter knife according to a first embodiment of the present disclosure will be described. In the following description, a safety cutter knife for unpacking work will be described as one example of the safety cutter knife according to the first embodiment, but the safety cutter knife is not limited to the one for unpacking work.

FIG. 1 is a top diagram depicting one example of a safety cutter knife 1 of the first embodiment according to the present disclosure. As depicted in FIG. 1, the safety cutter knife 1 includes a blade part 2 and a grip part 3, and the blade part 2 is detachably attached to the grip part 3.

Figure 2A:
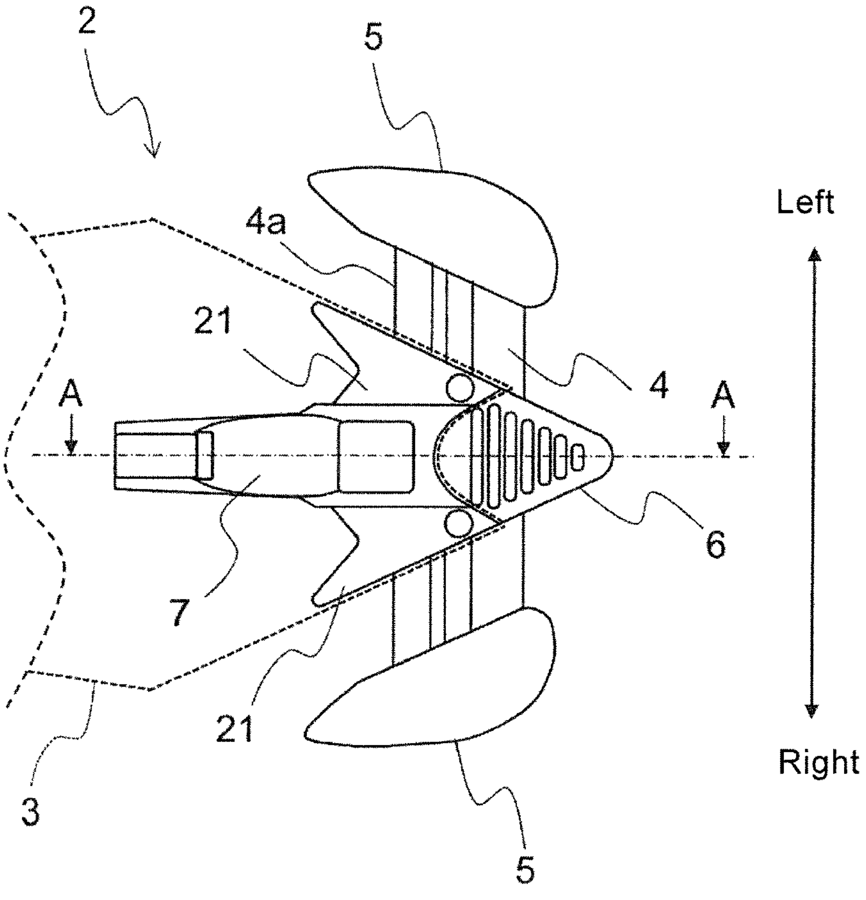
FIG. 2A and FIG. 2B are a top diagram and a cross-sectional diagram of a blade part of the first embodiment.
Figure 2B:
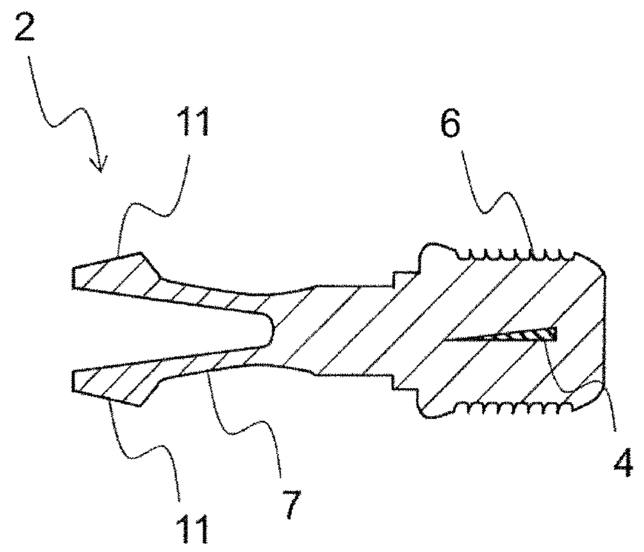

FIG. 2A is a top diagram of the blade part 2 of the first embodiment and FIG. 2B is a cross-sectional diagram taken along an A-A line in FIG. 2A.

In the first embodiment, the blade part 2 has a structure that has left-right symmetry and front-rear symmetry. Due to the above structure, the blade part 2 can be attached to the grip part 3 without any attention paid to the orientation of the blade part 2. As depicted in FIG. 2A, the blade part 2 includes a blade 4, guards 5, and a head 6. The guards 5 are fixed each on both ends of the blade 4 in the longitudinal direction thereof, and the head 6 is fixed to the central portion of the blade 4.

One edge of the blade 4 in the width direction thereof acts as a cutting edge 4*a* for cutting a piece of cardboard or the like and the cutting edge 4*a* is exposed between each of the guards 5 and the head 6.

The guards 5 each protrude from the cutting edge 4*a*, prevent a user from touching the cutting edge 4*a* exposed between the guards 5 and the head 6, and becoming injured, and improve the safety of the safety cutter knife 1. The length of the cutting edge 4*a* exposed between the head 6 and the guards 5 is, for example, 6.5 mm.

The head 6 fixes the blade 4 and extends at a right angle to the protruding direction of the blade 4. One end of the head 6 protrudes more than the cutting edge 4*a* of the blade 4 to form an inserting protrusion part 7 to be attached to the grip part 3, and the other end thereof protrudes more than an edge on the side opposite to that of the cutting edge 4*a* of the blade 4 to constitute the tip of the safety cutter knife 1. In the state where the inserting protrusion part 7 is attached inside the grip part 3, the portions of the head 6 other than the inserting protrusion part 7 protrude from the grip part 3, and the blade 4 and the guards 5 protrude from both sides of the grip part 3. As depicted in FIG. 2B, the inserting protrusion part 7 is a protruding portion having an almost shaft-like shape and, at the tips thereof, two first rugged structures 11 are disposed. The two first rugged structures 11 are disposed sandwiching a space therebetween, and are disposed such that a protrusion shape of each thereof face outwardly from the space. The inserting protrusion part 7 has flexibility such that the first rugged structures 11 can each be bent in a direction to make the space therebetween smaller.

In the head 6, two third rugged structures 21 are each disposed on opposite sides of a base portion of the inserting protrusion part 7 being adjacent to the base portion in the right-and-left direction. The third rugged structures 21 are fitted with fourth rugged structures 22 of the grip part 3 described later and each have, for example, a V-shaped notch whose shape matches with the shape of the fourth rugged structures 22.

In the state where the head 6 is attached to the grip part 3, a tip of the head 6 protrudes from the grip part 3. During the replacement of the blade part 2, the user grips the tip of the head 6 and detaches the blade part 2 from the grip part 3. The surface of the tip of the head 6 may have a slip resistance effect and, for example, a groove pattern to increase the friction resistance of the surface may be formed on the tip of the head 6.

During the manufacturing of the safety cutter knife 1, the blade 4 is placed in position when the guards 5 and the head 6 are melted. Thus, the guards 5 and the head 6 are formed by a material whose melting point is lower than that of the material of the blade 4. The blade 4 is formed by, for example, a metal such as steel. On the other hand, the guards 5 and the head 6 may be formed by a resin such as glass-fiber-reinforced ABS. The guards 5 and the head 6 may be formed by aluminum, zinc, or the like. The overall thickness of the blade 4 is preferably equal to or larger than 0.2 mm and equal to or smaller than 1.0 mm. The thickness of the blade 4 is more preferably equal to or larger than 0.2 mm and equal to or smaller than 0.8 mm. The thickness of the blade 4 is most preferably 0.7 mm. In this case, the cutting resistance of the blade 4 can be suppressed. In the first embodiment, the cutting edge 4*a* of the blade 4 has a straight line shape.

The grip part 3 includes a portion to be gripped by the user. The user grips the grip part 3, pulls the safety cutter knife 1 toward the user, and can thereby cut an object to be cut.

As depicted in FIG. 1, the grip part 3 detachably holds the head 6 in the state where the cutting edge 4*a* of the blade 4 and the guards 5 in the blade part 2 are protruding.

Figure 3:
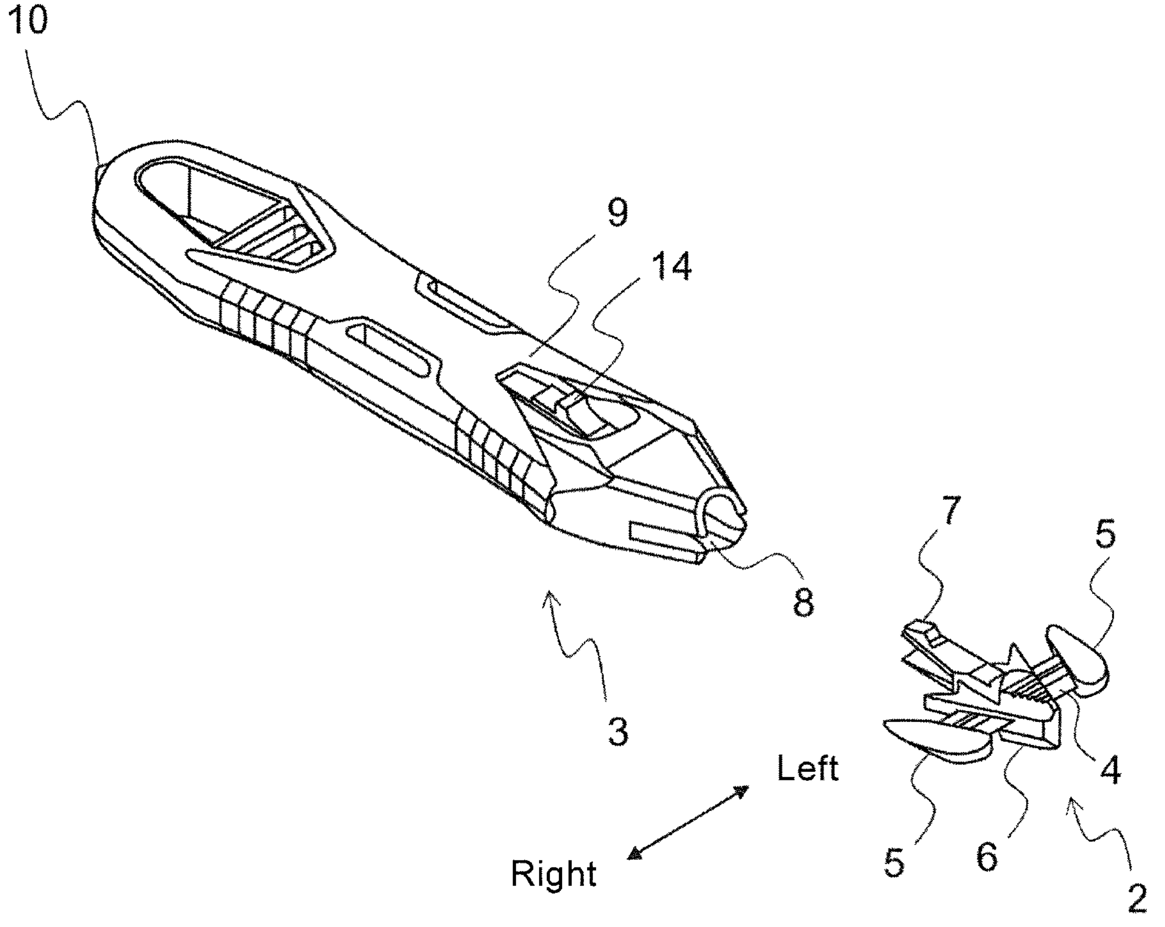
FIG. 3 is a diagram of the state where the blade part of the safety cutter knife in FIG. 1 is detached.

FIG. 3 is a diagram of the state where the blade part 2 is detached from the safety cutter knife 1 in FIG. 1, and the blade part 2 is separated from the grip part 3.

As depicted in FIG. 3, the grip part 3 is the portion to be gripped by the user, extends in the longitudinal direction, and the blade part 2 is attached to one end thereof. On one end of the grip part 3, a hole part 8 is disposed, into which a portion of the head 6 including the inserting protrusion part 7 is to be inserted. The thickness of the grip part 3 is smaller than the width thereof, and the grip part 3 has a shape that has left-right symmetry (the width direction) and front-rear symmetry (the thickness direction) in the longitudinal direction thereof. The grip part 3 is formed to be easily gripped by the user and has, for example, a constriction in the central portion thereof.

The grip part 3 is manufactured by metal molding and is formed by a material whose melting point is lower than that of the material of the blade 4 of the blade part 2. The grip part 3 may be formed by a resin such as glass-fiber-reinforced ABS. The grip part 3 may be formed by aluminum, zinc, or the like.

As depicted in FIG. 3, on each of a front face and a rear face of the grip part 3, a slip resistor 9 is disposed that covers a portion of the grip part 3. The slip resistor 9 increases the friction resistance of the surface of the grip part 3 and causes the tips of the fingers of the user to avoid slipping on the grip part 3. The slip resistor 9 may be formed by a material that increases the friction resistance such as, for example, a rubber. In the first embodiment, the slip resistor 9 has an X-like shape such that the positions of the palm and the thumb of the user abut thereon when the user grips the grip part 3. Because the slip resistor 9 is formed on both faces of the grip part 3 and has the X-like shape, the slip resistance effect achieved by the slip resistors 9 is increased regardless of the dominant hand of the user.

As depicted in FIG. 3, a tape slitter 10 is disposed on the other end of the grip part 3. The tape slitter 10 is formed as a rounded thin plate shape and the safety is thereby improved.

Figure 4:
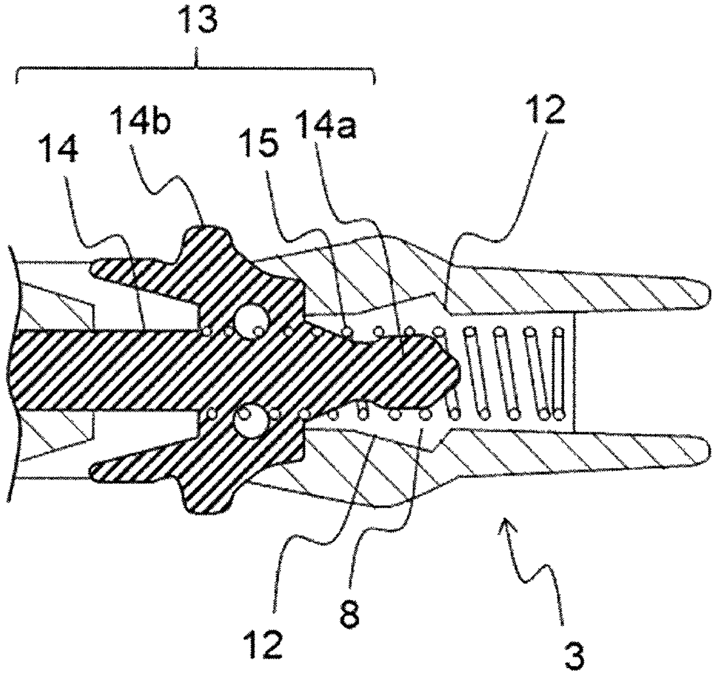
FIG. 4 is a cross-sectional diagram of a portion of each of the grip part and a holding mechanism of the first embodiment.
Figure 5A:
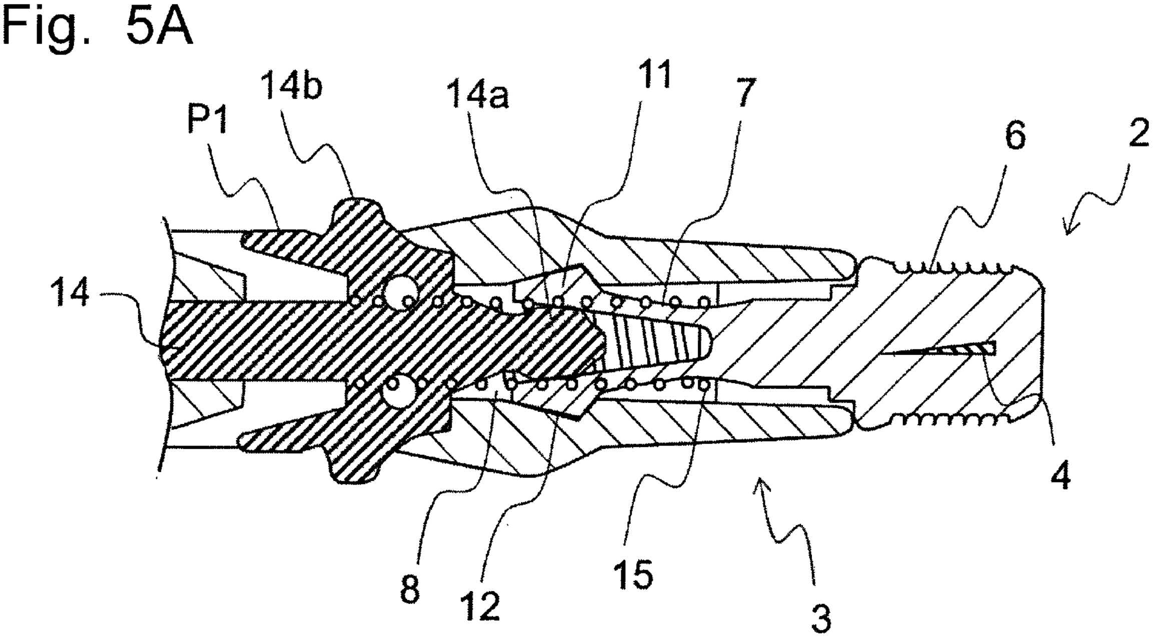
FIG. 5A and FIG. 5B are each a cross-sectional diagram of a portion of the safety cutter knife of the first embodiment.

FIG. 4 is a cross-sectional diagram of a portion of each of the grip part 3 and a holding mechanism 13 described later of the first embodiment. As depicted in FIG. 4, two second rugged structures 12 each having a recess shape are disposed each facing each other on an inner wall of the hole part 8 of the grip part 3. As depicted in FIG. 5A described later, when the blade part 2 is attached to the grip part 3, the first rugged structures 11 and the second rugged structures 12 are fitted with each other.

In the first embodiment, the safety cutter knife 1 further includes the holding mechanism 13. As depicted in FIG. 4, the holding mechanism 13 includes a lever 14 and a spring 15, and releasably maintains the state where the blade part 2 is attached to the grip part 3.

Figure 5B:
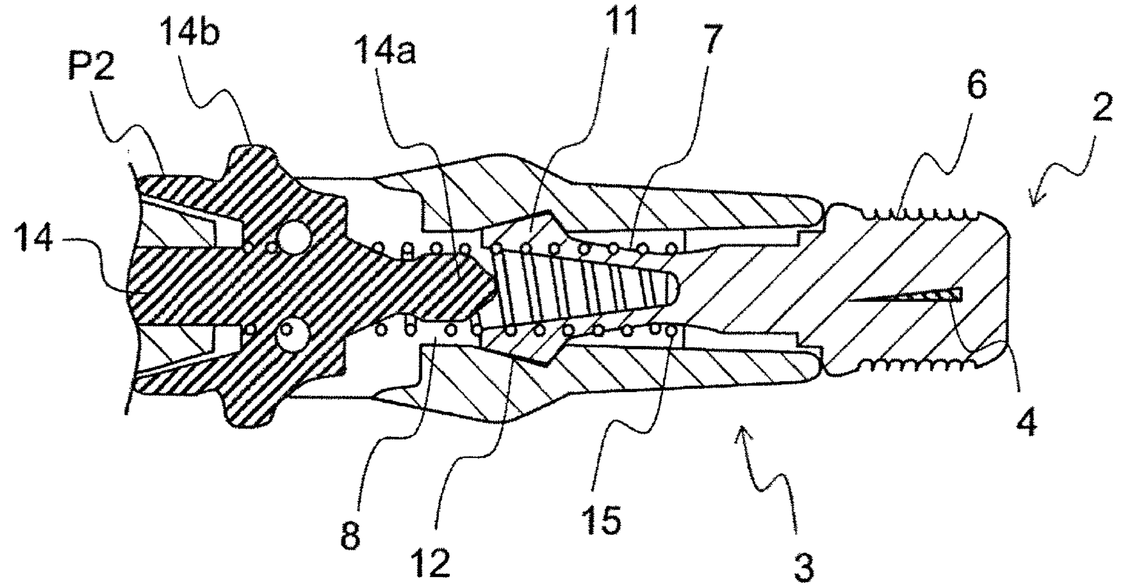

As depicted in FIG. 4, the lever 14 is disposed in the grip part 3 and can move forward and backward along the longitudinal direction of the grip part 3. As depicted in FIGS. 5A and 5B each described later, the lever 14 can move between a holding position P1 and a release position P2 each described later. The lever 14 includes exposed portions 14*b* that are each exposed in one of the front and the rear faces of the grip part 3, and the user operates the exposed portions 14*b* to move the exposed portions 14*b* and the lever 14 is thereby moved between the holding position P1 and the release position P2. Because the exposed portions 14*b* are formed on both sides of the grip part 3, the user of the safety cutter knife 1 can easily operate the lever 14 by moving either of the exposed portions 14*b* regardless of the dominant hand of the user. The holding mechanism 13 is disposed surrounding the lever 14, and further includes the spring 15 that biases the lever 14 from the release position P2 toward the holding position P1. When the user releases the user's hand from the exposed portions 14*b* that is present at the release position, the lever 14 returns to the holding position P1 because the lever 14 is biased by the spring 15.

FIG. 5A depicts a cross-sectional diagram taken when the fitting state of the first rugged structures 11 and the second rugged structures 12 is maintained and FIG. 5B depicts a cross-sectional diagram taken when the maintenance of the fitting state of the first rugged structures 11 and the second rugged structures 12 is released.

FIG. 5A depicts the safety cutter knife 1 in the state where the lever 14 is present at the holding position P1 and the blade part 2 is attached to the grip part 3. The holding position P1 is the position of the lever 14 at which the lever 14 maintains the fitting state of the first rugged structures 11 and the second rugged structures 12, and a tip 14*a* of the lever 14 is inserted into a space in the inserting protrusion part 7 to abut on the inserting protrusion part 7. The first rugged structures 11 are fixed by the abutting of the tip 14*a* and the inserting protrusion part 7 such that the first rugged structures 11 cannot be released from the second rugged structures 12. Because the lever 14 is biased by the spring 15 toward the holding position P1, the lever 14 is held at the holding position P1 and the blade part 2 is prevented from being detached from the grip part 3 without any intention of the user of the safety cutter knife 1.

FIG. 5B depicts the safety cutter knife 1 in the state where the lever 14 is present at the release position P2. The release position P2 is the position of the lever 14 in which the tip 14*a* is away from the space of the inserting protrusion part 7. In the release position P2, the space of the inserting protrusion part 7 can be narrowed, and the maintenance of the fitting state of the first rugged structures 11 and the second rugged structures 12 is released. The user applies a force in the direction for the blade part 2 to be pulled out, so that the portions of the first rugged structures 11 thereby approach each other in the direction for the space to be narrowed, the fitting between the first rugged structures 11 and the second rugged structures 12 is released, and the blade part 2 is detached from the grip part 3. In the release position P2, when a force is applied in the direction for the blade part 2 to be pulled out, an inclined face that causes the fitting between the first rugged structures 11 and the second rugged structures 12 to be released is disposed on each of the first rugged structures 11 and the second rugged structures 12. Due to the above configuration, by operating the lever 14, the user can detach the blade part 2 from the grip part 3 and replace the blade part 2.

Figure 6:
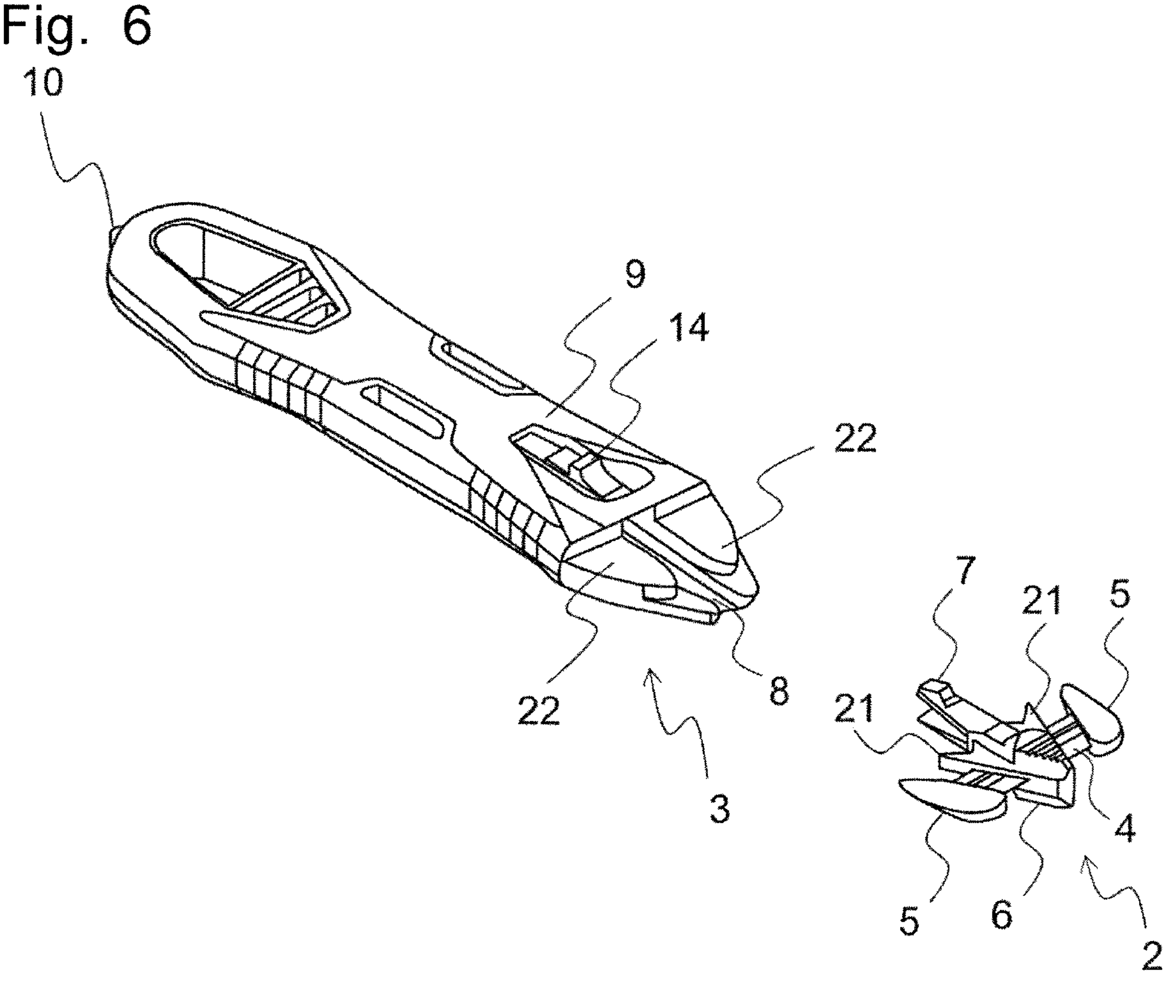
FIG. 6 is a diagram of the state where a portion of the grip part of the safety cutter knife in FIG. 1 is detached.

FIG. 6 is a diagram of the state where a portion of the grip part 3 is removed from the safety cutter knife 1 in FIG. 1 such that the inside of the grip part 3 is partially exposed. As depicted in FIG. 6, fourth rugged structures 22 are disposed in the inside of the grip part 3 on both sides of the hold part 8. When the blade part 2 is attached to the grip part 3, the third rugged structures 21 disposed on the head 6 are inserted into the hole part 8 of the grip part 3, and are brought into surface contact with the fourth rugged structures 22 to be fitted therewith. The fitting between the third rugged structures 21 and the fourth rugged structures 22 can suppress movement of the grip part 2 caused by a force acting on one side of the blade 4 used for the cutting. By the force acting on one side of the blade 4, a moment having the fitting between the first rugged structures 11 and the second rugged structures 12 as the fulcrum thereof is generated. The fitting between the third rugged structures 21 and the fourth rugged structures 22 can suppress any rotation of the blade part 2 caused by the moment. Any jouncing of the blade part 2 against the grip part 3 can be suppressed by suppressing movement and rotation of the blade part 2. In the first embodiment, the fourth rugged structures 22 each have a V-like shape and the V-like shapes thereof are fitted with the V-shaped notches of the third rugged structures 21. The fourth rugged structures 22 each have the V-like shape, the contact areas thereof are thereby increased, and the effect of suppressing the jouncing is further improved. The fourth rugged structures 22 each have a surface with a different angle to the protruding direction of the blade 4, and any jouncing of the blade part 2 can thereby further be suppressed even in the case where a force acts on either side of the blade 4.

According to the safety cutter knife 1 of the first embodiment, the following effects can be achieved.

The safety cutter knife 1 includes the blade part 2 and the grip part 3. The blade part 2 includes the blade 4, the guards 5 disposed on both sides of the blade 4, and the head 6 on which the blade is fixed. The cutting edge 4*a* of the blade 4 is exposed between the guards and the head 6. The grip part 3 detachably holds the head 6 in the state where the cutting edge 4*a* of the blade 4 and the guards 5 in the blade part 2 protrude.

Due to the above configuration, the blade part 2 including the blade 4 can be replaced. Even in the case where the cutting edge 4*a* is worn and the cutting resistance is increased during repeated cutting, the increased cutting resistance can be recovered by replacing the blade part 2. The safety cutter knife 1 can therefore be continuously used for a longer period of time without discarding the safety cutter knife 1, and any resource loss can be suppressed. In the case where plural blade parts 2 have multiple different specifications, when cutting different objects, the blade part 2 can be changed depending on the object to be cut. The cutting resistance can thereby be reduced, the fatigue of the hand of the user can be suppressed, and the object can be cut more easily. The work efficiency of unpacking work and the like using the safety cutter knife 1 can therefore be improved.

The blade part 2 includes the guards 5. The hand of the user is thereby prevented from contacting the end and the cutting edge 4*a* of the blade 4. When a container such as a corrugated cardboard box is unpacked, the guards 5 prevent the end of the blade 4 from damaging the articles held in the container. The safety of the safety cutter knife 1 can thereby be improved.

The first rugged structures 11 are disposed on the head 6 of the blade part 2, and the second rugged structures 12 capable of being fitted with the first rugged structures 11 are disposed on the grip part 3. The safety cutter knife 1 includes the holding mechanism 13 that releasably maintains the fitting state of the first rugged structures 11 and the second rugged structures 12.

Due to the above configuration, the holding mechanism 13 maintains the fitting state of the first rugged structures 11 and the second rugged structures 12, and the blade part 2 is thereby kept attached to the grip part 3. The maintenance of the fitting state of the first rugged structures 11 and the second rugged structures 12 is released by the holding mechanism 13 and the blade part 2 can thereby be detached from the grip part 3.

The holding mechanism 13 includes the lever 14 that is movable between the holding position P1 at which the lever 14 maintains the fitting state of the first rugged structures 11 and the second rugged structures 12 and the release position P2 at which the lever 14 releases the fitting state, and a portion of the lever 14 is disposed being operably exposed from the grip part 3.

Due to the above configuration, the fitting state of the first rugged structures 11 and the second rugged structures 12 can be maintained by moving the lever 14 to the holding position P1 by operating the exposed portions 14*b* of the lever 14 without using any tool. On the other hand, the maintenance of the fitting state of the first rugged structures 11 and the second rugged structures 12 can be released by moving the lever 14 to the release position P2. The user can thereby easily detach the blade part 2 from the grip part 3. Because the replacement of the blade part 2 is easy, the time period necessary for the replacement is reduced and the efficiency of the work conducted using the safety cutter knife 1 is improved.

The holding mechanism 13 includes the spring 15 that biases the lever 14 from the release position P2 toward the holding position P1.

Due to the above configuration, in the state where the user does not touch the lever 14, the lever 14 is kept at the holding position P1 thereof and the attachment state of the blade part 2 and the grip part 3 is maintained. The blade part 2 can be prevented from being detached from the grip part 3 without any intention of the user. After moving the lever 14 from the holding position P1 to the release position P2, the user only needs to release the user's finger from the lever 14 and the lever 14 will return to the holding position P1. On the other hand, the user operates the lever 14 with intent, the lever 14 is thereby moved from the holding position P1 to the release position P2, and the blade part 2 can be detached from the grip part 3.

On both sides of the grip part 3, the portion of the lever 14 is operably exposed.

Due to the above configuration, the lever 14 can be operated regardless of the front and the rear faces of the grip part 3, regardless of the dominant hand of the user, and without changing the manner of gripping by the user, and the time period necessary for replacing the blade part 2 can therefore further be reduced.

The inserting protrusion part 7 including the first rugged structures 11 is disposed on the end of the head 6. The hole part 8 into which the inserting protrusion part 7 is inserted and that includes the second rugged structures 12 is disposed on the end of the grip part 3. The third rugged structures 21 are disposed on the end of the head 6 on both sides of the inserting protrusion part 7. The fourth rugged structures 22 to be fitted with the third rugged structures 21 are disposed on the end of the grip part 3 on both sides of the hole part 8.

Due to the above configuration, any jouncing of the blade part 2 against the grip part 3 can further be suppressed when the safety cutter knife 1 is used. The fourth rugged structures 22 each have a face that each have a different angle with regards to the protruding direction of the blade 4 and any jouncing of the blade part 2 can thereby be suppressed in the case where a force acts on either side of the blade 4.

The grip part 3 includes the slip resistor 9 that covers the portion of the grip part 3 and that increases the friction resistance of the surface thereof.

Due to the above configuration, the friction resistance of the surface of the grip part 3 is increased by the slip resistor 9 and the tips of the fingers of the user can avoid slipping.

An example where the grip part 3 has the symmetric structure is described in the first embodiment while the structure is not limited to the above. The grip part 3 may have an asymmetric structure. For example, the grip part 3 may have two types of shape each dedicated to the dominant hand of each user.

An example where the inserting protrusion part 7 is inserted into the grip part 3 is described in the first embodiment while the manner of attachment is not limited to the above. The blade part 2 may include an opening and a portion of the grip part 3 may be attached to the blade part 2.

An example where the slip resistor 9 is formed by a rubber is described in the first embodiment while the material is not limited to the above. The slip resistor 8 may be formed by another material and may have a surface shape that increases the friction resistance. For example, the slip resistor 9 includes recesses and protrusions on the surface thereof to increase the surface area and to thereby increase the friction resistance. Due to the above configuration, any slipping of the hand of the user gripping the safety cutter knife 1 is further prevented.

An example where the blade 4 is formed by a metal is described in the first embodiment while the material is not limited to the above. The blade 4 may be formed by a ceramic material.

An example where the cutting edge 4*a* has a straight line shape is described in the first embodiment while the shape is not limited to the above. The cutting edge 4*a* may have a curved line shape or a saw-tooth shape.

An example where the safety cutter knife 1 includes the first rugged structures 11 and the second rugged structures 12 is described as the safety cutter knife 1 of the first embodiment while the configuration is not limited to the above. The safety cutter knife 1 may include screws. For example, the safety cutter knife 1 includes screws that fix the blade part 2 and the grip part 3 on each other after the blade part 2 is attached to the grip part 3. Due to the above configuration, the blade part 2 can similarly be tightly held by the grip part 3 and the blade part 2 can be prevented from being detached from the grip part 3 without any intention of the user.

An example of the safety cutter knife 1 whose lever 14 is exposed in the two faces of the grip part 3 is described in the first embodiment while the configuration is not limited to the above. The lever 14 may include one exposed portion 14*b*. Due to this configuration, the structure of the safety cutter knife 1 can further be simplified and the manufacturing cost of the safety cutter knife 1 can be suppressed.

Second Embodiment

A safety cutter knife according to a second embodiment of the present disclosure will be described. In the second embodiment, the points different from the first embodiment will mainly be described. In the second embodiment, configurations same as or equivalent to those of the first embodiment will be denoted by the same reference numerals as those in the first embodiment and will not again be described.

Figure 7:
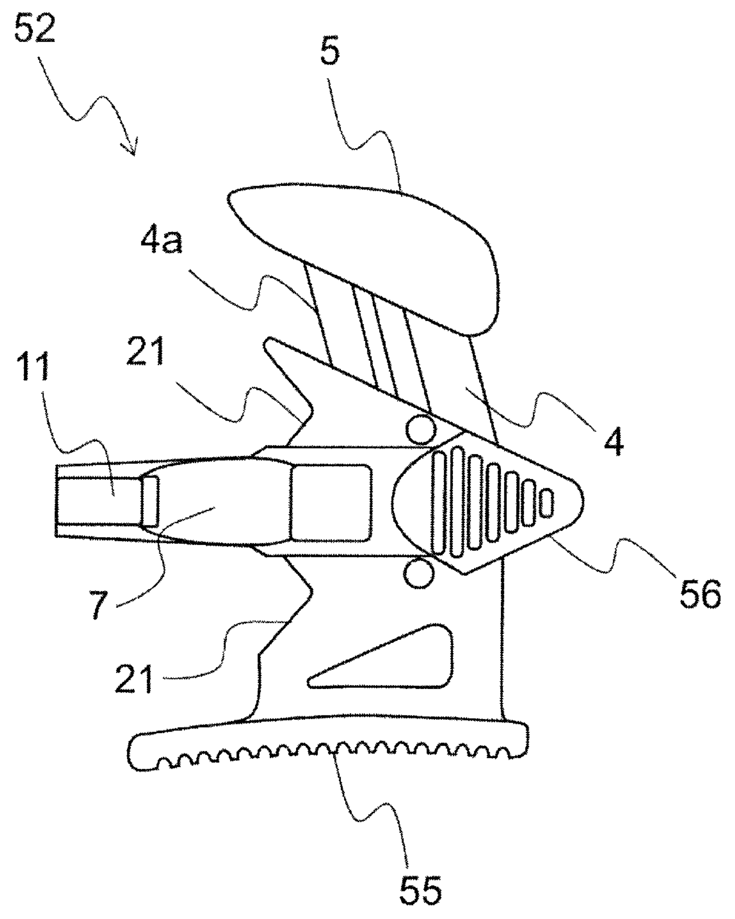
FIG. 7 is a top diagram of one example of a blade part of a second embodiment according to the present disclosure.

FIG. 7 is a schematic diagram of one example of a blade part 52 of the second embodiment according to the present disclosure.

The second embodiment differs from the first embodiment in that the blade protrudes on only one side of the grip part. Unless otherwise specified, a safety cutter knife 1A is same as the safety cutter knife 1 of the first embodiment.

In the second embodiment, the safety cutter knife 1A includes the blade part 52. As depicted in FIG. 7, the blade part 52 includes the blade 4 that includes the cutting edge 4*a*, one guard 5 disposed on one end of the blade 4, and a head 56. The blade 4 is fixed on one side of the head 56 to protrude therefrom, and a pressing part 55 is disposed on the opposite side of the head 56. The user can place a thumb of the user on the pressing part 55 and apply a force to the blade part 52.

According to the above configuration, the user can cut an object with the safety cutter knife 1A using a larger force. For example, the user can easily cut an object having a larger thickness or an object having higher cutting resistance such as plural pieces of cardboard stacked on each other, using the safety cutter knife 1A.

An example where the thumb is placed on the pressing part 55 of the blade part 52 is described in the second embodiment while the user may place another finger on the pressing part 55.

The present disclosure has been fully described with relation to the preferred embodiments with reference to the accompanying drawings while various changes and modifications are obvious to those skilled in the art. It should be understood that these changes and modifications are included in the scope of present disclosure, to the extent that they do not depart from the scope of the present disclosure as laid out in the appended claims.

INDUSTRIAL APPLICABILITY

The safety cutter knife of the present disclosure is useful as a safety cutter knife used in, for example, unpacking work because the blade part and the grip part thereof are detachably held such that the blade part can easily be replaced.

EXPLANATION OF REFERENCE NUMBERS

1 safety cutter knife
2 blade part
3 grip part
4 blade
4*a* cutting edge
5 guard
6 head
7 inserting protrusion part
8 hole part
9 slip resistor
10 tape slitter
11 first rugged structure
12 second rugged structure
13 holding mechanism
14 lever
15 spring
21 third rugged structure
22 fourth rugged structure
52 blade part
55 pressing part

The invention claimed is:

1. A safety cutter knife comprising:

a blade part including a blade, a guard disposed on one end of the blade, and a head on which the blade is fixed, a cutting edge of the blade being exposed between the guard and the head; and a grip part that detachably holds the head in a state where the cutting edge of the blade and the guard in the blade part are protruded, wherein an end of the blade part includes an inserting protrusion part that has a shaft-like shape, an end of the grip part includes a hole part into which the inserting protrusion part is inserted, the inserting protrusion part includes a pair of portions each having a free end that extends along an axis direction from an end of the head, a space is formed between the free ends of the pair of portions, the pair of portions is resiliently deformable between positions thereof away from each other and positions thereof close to each other, two first rugged structures are disposed on an outer side face of the free ends of the pair of portions, two second rugged structures capable of being fitted with the first rugged structures are disposed on an inner wall of the hole part, two third recess and protrusion structures are disposed on the end of the head on both sides of the inserting protrusion part, and two fourth recess protrusion structures fitted with the third recess and protrusion structures are disposed on the end of the grip part on both sides of the hole part, wherein the safety cutter knife further comprises a lever that is movable along the axis direction between a holding position that maintains a fitting state of the first rugged structures and the second rugged structures and a release position that releases the maintenance of the fitting state, wherein in the holding position, a tip of the lever is inserted into the space of the pair of portions and the pair of portions are restricted to be at positions away from each other, and in the release position, the tip of the lever moves away from the space of the pair of portions and the pair of portions becomes deformable to positions close to each other.

2. The safety cutter knife according to claim 1, wherein a portion of the lever is disposed being operable along the axis direction and being exposed from the grip part.

3. The safety cutter knife according to claim 2, comprising a spring that biases the lever along the axis direction from the release position toward the holding position.

4. The safety cutter knife according to claim 3, wherein a portion of the lever is operably exposed along the axis direction on both sides of the grip part.

5. The safety cutter knife according to claim 4, wherein the grip part includes a slip resistor that covers a portion of the grip part and increases friction resistance of a surface thereof.

6. The safety cutter knife according to claim 3, wherein the grip part includes a slip resistor that covers a portion of the grip part and increases friction resistance of a surface thereof.

7. The safety cutter knife according to claim 2, wherein the portion of the lever is operably exposed along the axis direction on both sides of the grip part.

8. The safety cutter knife according to claim 7, wherein the grip part includes a slip resistor that covers a portion of the grip part and increases friction resistance of a surface thereof.

9. The safety cutter knife according to claim 2, wherein the grip part includes a slip resistor that covers a portion of the grip part and increases friction resistance of a surface thereof.

10. The safety cutter knife according to claim 1, wherein the grip part includes a slip resistor that covers a portion of the grip part and increases friction resistance of a surface thereof.

* * * * *